No. 855,096. PATENTED MAY 28, 1907.
J. W. COOPER.
SPRING WHEEL.
APPLICATION FILED JAN. 9, 1907.

3 SHEETS—SHEET 1.

Witnesses

Inventor
J. W. Cooper.
By
Attorneys

No. 855,096. PATENTED MAY 28, 1907.
J. W. COOPER.
SPRING WHEEL.
APPLICATION FILED JAN. 9, 1907.
3 SHEETS—SHEET 2.
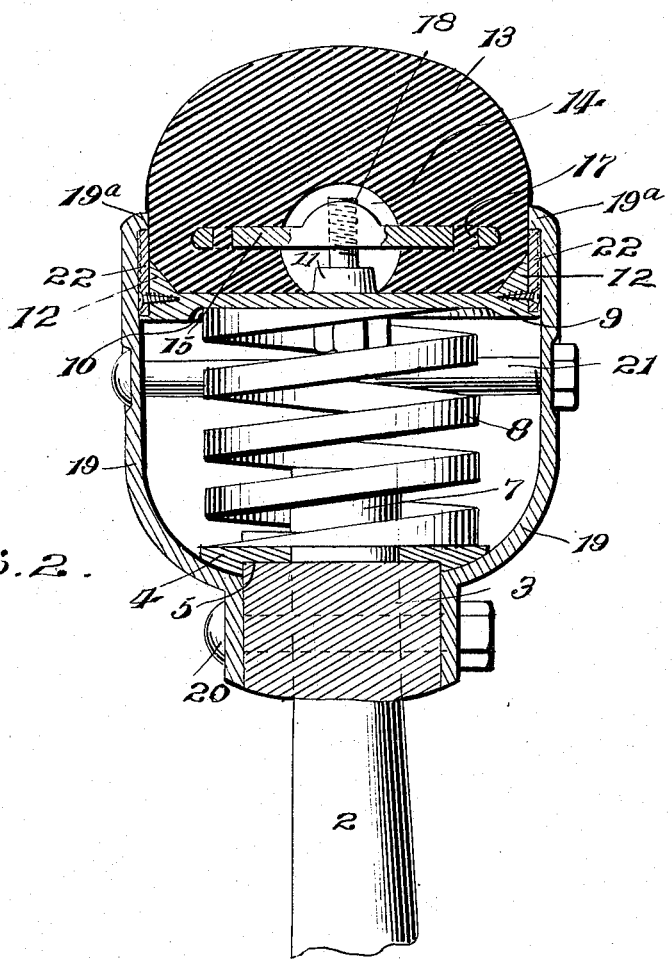
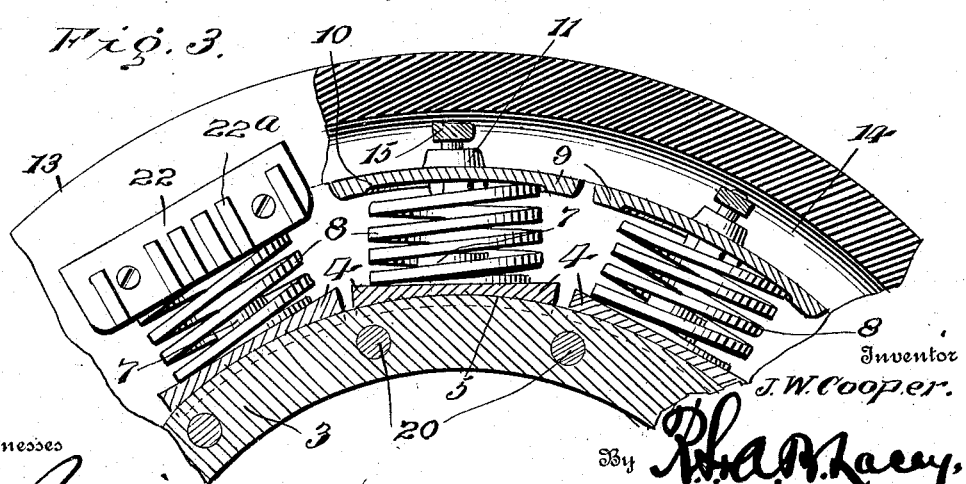

No. 855,096. PATENTED MAY 28, 1907.
J. W. COOPER.
SPRING WHEEL.
APPLICATION FILED JAN. 9, 1907.
3 SHEETS—SHEET 3.
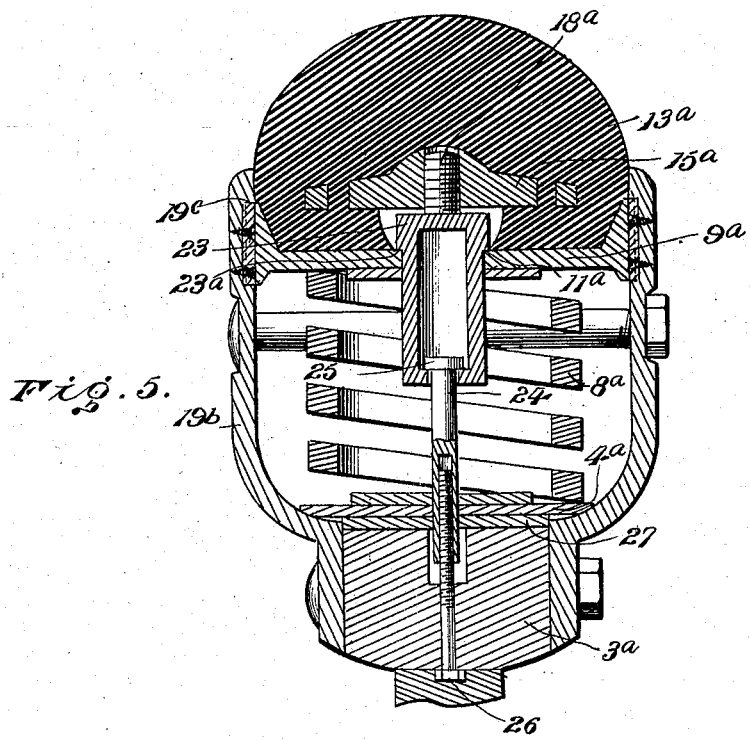
Fig. 5.
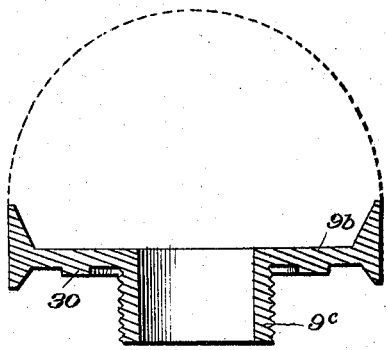
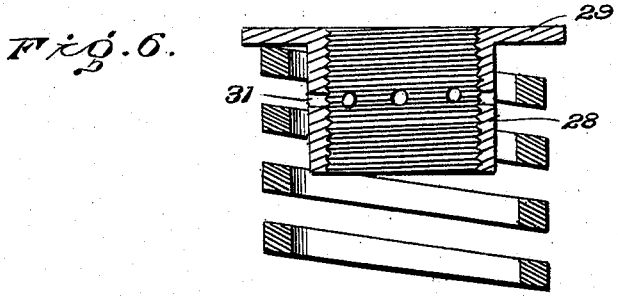
Fig. 6.
Witnesses
Inventor
J. W. Cooper
By R. A. B. Lacey,
Attorneys

UNITED STATES PATENT OFFICE.

JOHN W. COOPER, OF BOSTON, MASSACHUSETTS.

SPRING-WHEEL.

No. 855,096.　　　Specification of Letters Patent.　　　Patented May 28, 1907.

Application filed January 9, 1907. Serial No. 351,561.

*To all whom it may concern:*

Be it known that I, JOHN W. COOPER, a citizen of the United States, residing at Boston, in the county of Suffolk and State of Massachusetts, have invented certain new and useful Improvements in Spring-Wheels, of which the following is a specification.

This invention contemplates certain new and useful improvements in that type of wheels which depend for their resiliency upon a series of coiled springs interposed between the felly and the tire, and the primary object of my invention is to provide a wheel of this type which will embody characteristics of durability, simplicity of construction ease with which the parts may be assembled and disassembled, lightness and extreme resiliency without the disadvantageous features that are inherent in resilient wheels provided with pneumatic tires.

With this and other objects in view as will more fully appear as the description proceeds, the invention consists in certain constructions, arrangements and combinations of the parts hereinafter described and particularly pointed out in the appended claims.

Figure 1:
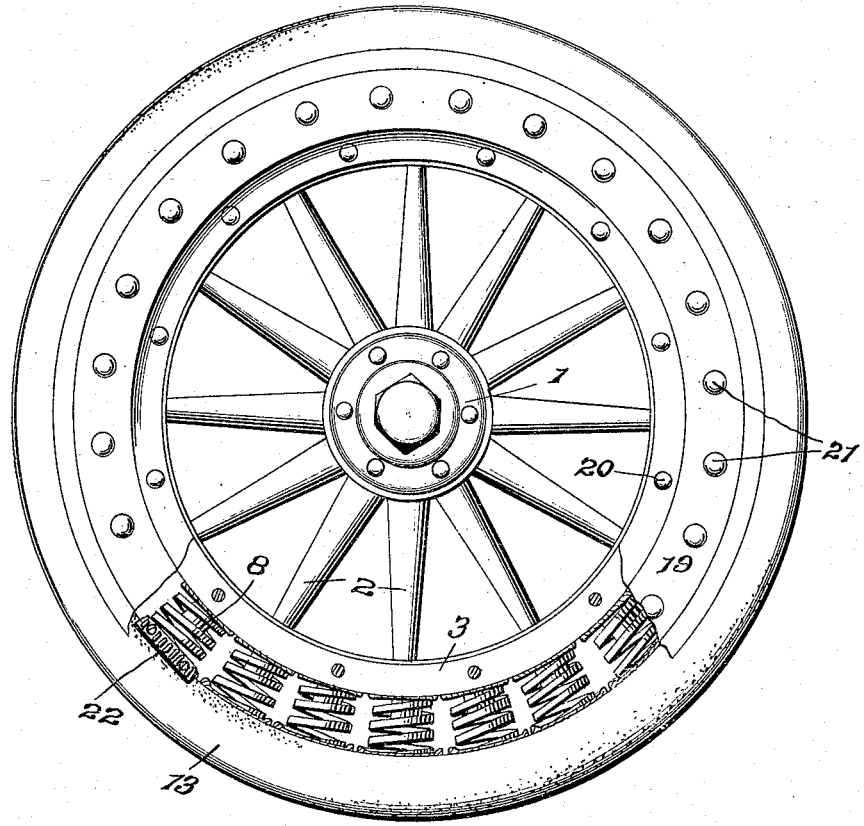
Figure 4:
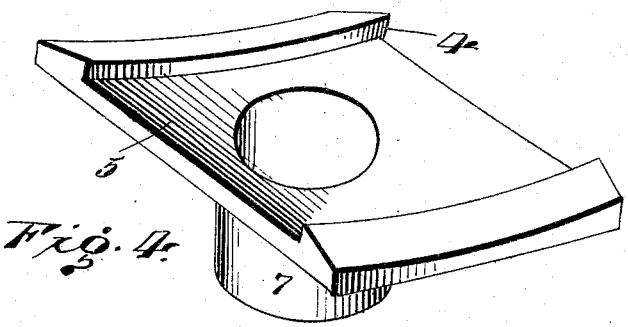

Reference is to be had to the accompanying drawings, in which:

Figure 1 is a side elevation of a spring wheel embodying features of my invention, parts being broken out to illustrate the inner construction; Fig. 2 is an enlarged transverse sectional view through the rim of the wheel; Fig. 3 is a longitudinal sectional view of a portion of the wheel rim; Fig. 4 is a detail perspective view of one of the rim plates detached; Fig. 5 is a transverse sectional view illustrating certain modifications hereinafter specifically referred to; and, Fig. 6 is a detail sectional view illustrating other modifications.

Corresponding and like parts are referred to in the following description and indicated in all the views of the drawings by the same reference characters.

Referring to the drawings, the numeral 1 designates the hub of a wheel, 2 the spokes thereof, and 3 the felly.

4 designates a series of plates that are provided with longitudinal recesses 5 in their inner faces so as to produce two side flanges which are adapted to embrace the side edges of the felly, as best seen in Fig. 2. Each of the plates 4 is provided on its outer side or face with a boss 7 which is preferably hollow. Coiled springs 8 are mounted to fit with their inner ends around the respective bosses 7 on the plates 4 and the outer ends of these springs are designed to be retained in place by means of shoes 9 which are provided in their inner faces with recesses 10, preferably circular, in which the outer ends of the springs fit. In addition to the recesses 10, each of the shoes 9 is provided with a central opening 11 extending therethrough and reinforced by a small boss, as shown, and each shoe is also provided with outwardly extending side flanges 12 that slope outwardly or are beveled on their inner sides as shown.

13 designates a tire which is of the cushion type and is provided with a centrally cored opening 14 continuing throughout its entire extent. The tire 13 is preferably endless, and to secure the tire to the wheel in a manner to insure against its accidental displacement, I provide a series of transversely extending bars 15 which are embedded at their ends within the tire on opposite sides of the opening 14 and which are vulcanized in the tire and are provided at their ends with apertures 17 through which the rubber may extend in order to firmly secure these cross bars within the tire body. The bars 15 extend across the opening 14, as shown, and are provided within the opening with screw threaded apertures designed to receive bolts 18 projecting outwardly through the openings 11 of the shoes 9 so as to securely attach the cross bars to the said shoes and thereby hold the tire firmly in place.

In connection with the springs, the tire and the other parts before described, I provide side plates 19 that are adapted to inclose all of the working parts of the tire, as shown. These side plates are secured to the opposite sides of the felly 3 by means of the bolts 20 and are also reinforced at their outer edges by means of bolts 21 which extend between every two adjacent springs. The outer edges of the side plates 19 are provided with inwardly facing shoulders 19$^a$, and interposed between the outer edges of the side plates and the sides of the shoes 9, are wear plates 22 which are secured by screws or the like to the opposite sides of each shoe 9 and are adapted to engage when the shoe moves outwardly to engage with the said shoulder 19$^a$ to limit the outward movement of the tire with respect to the felly. It is proposed to make the plates 4 and the shoes 9 of aluminium or other light metal and in order to obtain the desired wearing qualities for the tire, the wear plates 22 are provided to receive the abrasive wear consequent upon the action of the tire. The wear plates may be formed of any combination metal suitable for this purpose, and are preferably formed with a series of recesses 22ª to lighten them and reduce the area of contacting surface.

From the foregoing description in connection with the accompanying drawing, it is evident that the tire will be securely held to the shoes 9 by means of the bolts 18 and the cross bars 15 embedded in the tire. It is manifest that these bolts may be applied readily before the springs 8 have been inserted in place between the shoes and their opposing plates 4. In the practical operation of the wheel, the wear plates 22 will move inwardly with the shoes 9 as the tire is pressed inwardly against the action of the springs and will receive all the wear consequent upon this action and that said plates will also limit the outward movement of the tire when it is pressed outwardly, owing to the engagement of said wear plates with the inwardly facing shoulders 19ª of the side plates 19.

Fig. 5 of the accompanying drawings illustrates a modification which is designed particularly to relieve the shoulders at the outer edges of the side plates from constant wear and strain of the outer sides of the wear plates or shoes and also for the purpose of screwing up or pulling the springs together, so as to increase their tension when putting the wheel together. From this view of the drawings, it will be seen that the cross bars 15ª are embedded within the tire 13ª and that they have openings to receive the bolts 18ª. In this modification, the bolts 18ª are formed as screw threaded integral extensions on the outer ends of open links or frames 23. These links 23 extend through the central openings 11ª of the shoes 9ª and are provided with shoulders 23ª which face inwardly and are adapted to abut against the walls of the openings 11ª. The links 23 extend inwardly from the shoes 9 into the circle of the respective springs 8ª, as clearly illustrated in the drawing. The inner ends of the links 23 are formed with openings through which headed link bolts 24 project, and have free movement, the outward relative movement of the parts being limited by the heads 25 of said bolts. The bolts 24 extend through the plates 4ª into the felly 3ª and are hollow at their inner ends and screw threaded as indicated to receive tension bolts 26 which extend inwardly through the felly as shown and into the hollow threaded inner ends of the link bolts 24. In this modification, as in the other form, the side plates (designated 19ᵇ) are provided at their outer edges with inwardly facing shoulders 19ᶜ. In this modification, as illustrated in Fig. 5, the wear plates are carried by the side plates 19ᵇ.

From the description of this modification, in connection with Fig. 5 of the drawings, it is evident that the tension bolt 26 may be manipulated to draw the link 23 inwardly and in so doing to draw the shoe 9ª inwardly so as to give an initial tension to the spring 8ª beyond its normal tension, when putting the parts of the wheel together. It is also evident that by drawing the link 23 inwardly with pressure against the shoe 9ª, constant wear and strain upon the shoulders 19ᶜ will be avoided and the rubber tire will be at all times securely held to the felly of the wheel or to the steel tire 27 which may be shrunk around the felly 3ª. As the tire is pressed inwardly by contact with the ground to compress the springs 8ª, it is evident that the inner ends of the link 23 will slide relatively to the link bolts 24 and that the outward movement of the parts is at all times limited by the connection between the parts 26, 24, and 23.

In the modification illustrated in Fig. 6, the shoe 9ᵇ is provided with a centrally threaded extension 9ᶜ, and within the outer end of each spring is an interiorly threaded collar 28 adapted to be screwed upon the extension 9ᶜ until its outward flange 29 abuts against the flange 30 of the shoe. The collar 28 is provided with a series of openings 31 for the reception of a rod or similar tool, so that by simply unscrewing the collar, the shoe 9ᵇ and the tire will be pushed up and the parts extended, and the wheel always maintained perfectly round, should the spring settle.

Having thus described the invention, what is claimed as new is:

1. In a vehicle wheel, the combination of a felly, a series of plates secured thereto and provided on their outer sides with seats for helical springs, springs seated at one end upon the outer sides of said plates, shoes provided in their faces with recesses into which the outer ends of the springs fit, said shoes being also provided with central openings and outwardly extending side flanges, a tire provided with a central opening and embedded cross bars extending across said opening, fastenings extending through said cross bars and the openings of the shoes whereby to secure the cross bars to the shoes and hold the tire between the side flanges of the shoes, side plates inclosing the shoes, the springs, and the first named plates, and wear plates interposed between the side edges of the shoes and the said side plates, as and for the purpose set forth.

2. In a wheel, the combination with the felly, of a series of plates secured to the outer face of the felly, a series of helical springs mounted at one end upon said plates, shoes into which the other ends of said springs fit, said shoes being provided with side flanges and with wear plates secured to the outer edges thereof and also formed with central openings, a tire adapted to fit between the side flanges of said shoes, a series of cross bars embedded in the tire, the tire being provided with an opening and the cross bars extending across said opening, bolts extending through the openings of the shoes and having a screw threaded engagement with the cross bars, and side plates secured at their inner edges to opposite sides of the felly and provided at their outer edges with inwardly facing shoulders adapted for engagement with the outer edges of said wear plates.

3. In a spring wheel, the combination with the felly of a series of helical springs, shoes carried by the outer ends of said springs, a tire adapted to rest in said shoes, a series of cross bars embedded in the tire, and means for securing said cross bars to the said shoes.

4. In a spring wheel, the combination with the felly of a series of helical springs, shoes carried by the outer ends of said springs, a tire adapted to rest in said shoes, a series of cross bars embedded in the tire, bolts connected to said cross bars, links connected to said bolts and mounted to slide through the said shoes and provided with shoulders limiting their inward movement with respect to the shoes, link bolts with which said links have a relatively slidable movement, and means for securing the said link bolts to the inner rim or felly of the wheel.

5. In a spring wheel, the combination of a series of helical springs, an inner and an outer rim between which said springs are interposed, said outer rim consisting of a plurality of shoes provided with central openings, links extending through said openings and having a slidable movement relative to the shoes, means for limiting the relative inward movement of the links with respect to the shoes, a tire mounted in said shoes and having operative connection with the links, link bolts having a relatively slidable engagement with the links, and tension bolts extending through the inner rim and connected thereto, and having an adjustable connection with said link bolts.

In testimony whereof I affix my signature in presence of two witnesses.

JOHN W. COOPER. [L. S.]

Witnesses:
THOMAS H. KEENAN,
OLIVER E. BENNETT.